3,043,164
Patented July 10, 1962

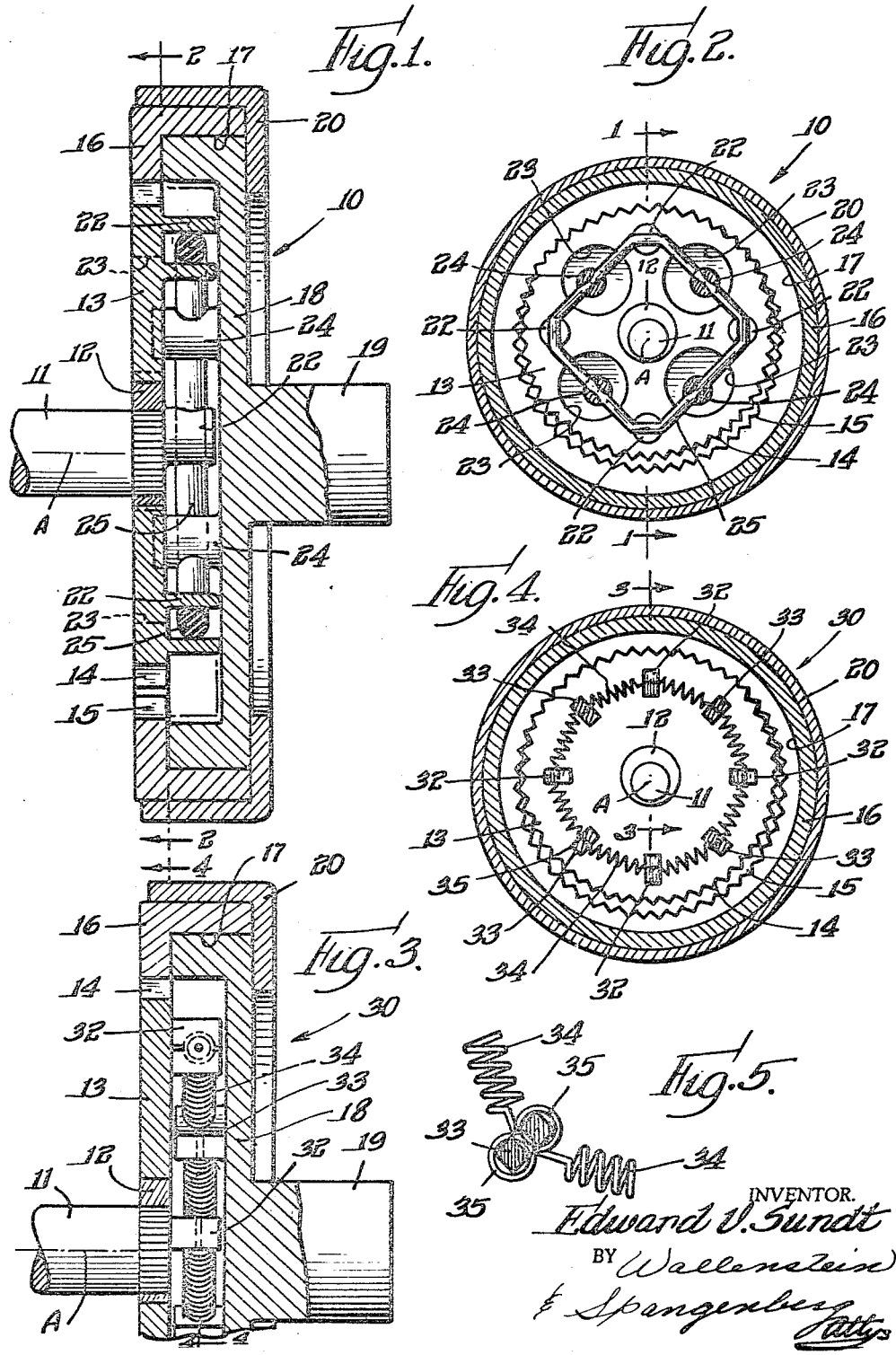

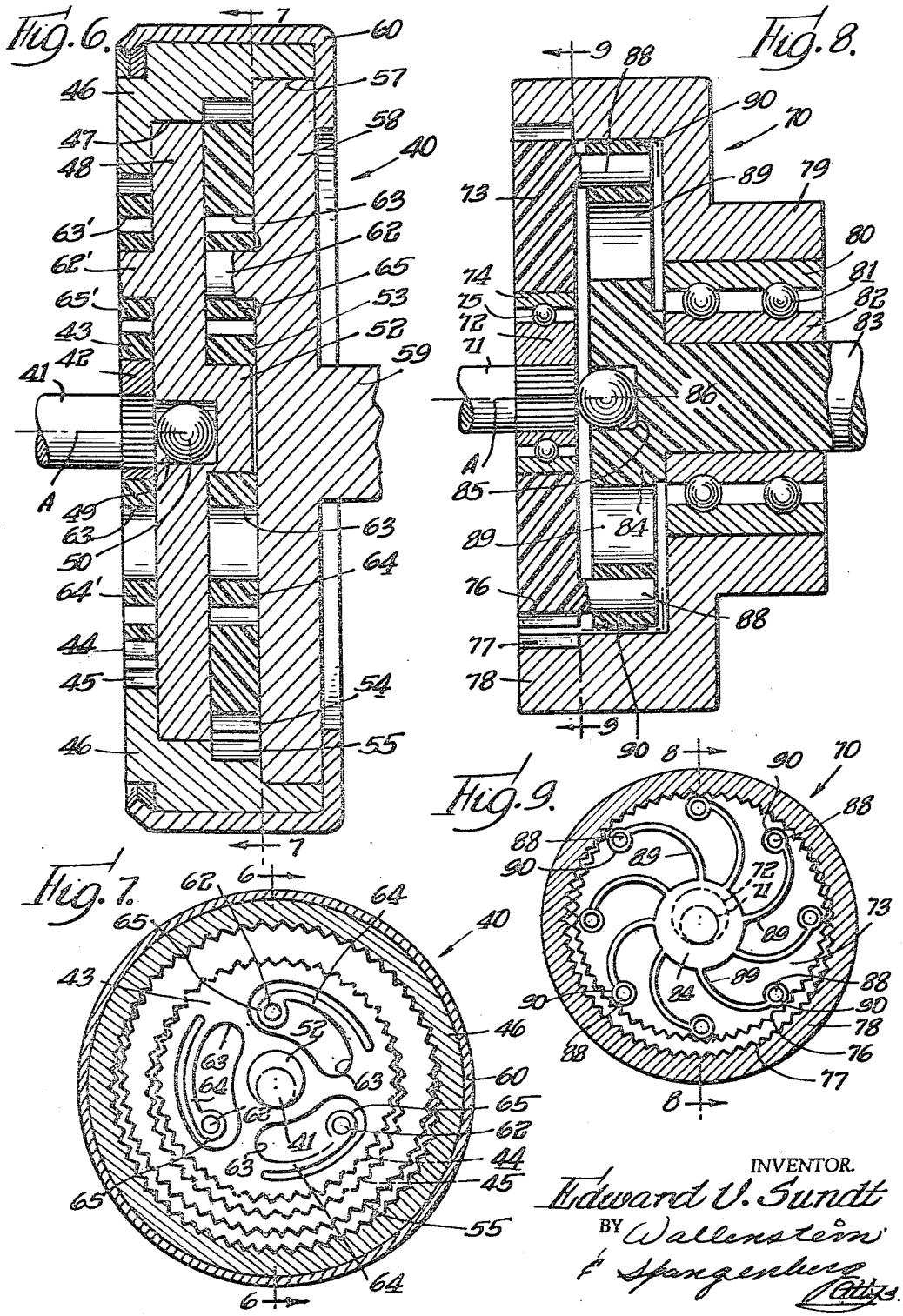

1

3,043,164
DIFFERENTIAL GEAR REDUCER
Edward V. Sundt, 118 Sterling Lane, Wilmette, Ill.
Filed May 11, 1959, Ser. No. 812,210
6 Claims. (Cl. 74—804)

The principal object of this invention is to provide an improved differential gear reducer wherein a stationary internal toothed annulus is concentrically arranged about a rotatable shaft, wherein an eccentric is carried by the shaft, wherein an external toothed rotor meshes with the internal toothed annulus and is rotatably mounted on the eccentric for oscillation with respect to the annulus and for rotation at a reduced speed in accordance with the relative numbers of teeth on the annulus and rotor, wherein an output member is rotatably mounted concentrically with the axis of the shaft, and wherein a resilient coupling is connected between the rotor and the output member for rotating the output member as the rotor is rotated.

In such a differential gear reducer the resilient coupling between the rotor and output member performs a number of functions. It transmits rotary motion from the rotating-oscillating rotor to the rotating output member and it does so in an efficient and reliable manner. In many differential gear reducers of this type, the oscillating rotor, in addition to rotating in a circumferential direction about the eccentric, also oscillates in that direction because of the meshing interaction of the rotor and annulus teeth, such oscillation causing noise and applying uneven rotary motion to the output member when the rotor is rigidly coupled to the output member as by the usual pin and hole couplings heretofore used. The resilient coupling of this invention operates to absorb such circumferential oscillations and to transmit uniform rotary motion to the output member and reduce noise. Further, the resilient coupling also effectively prevents load or tolerance stresses from being reflected back from the slow speed high torque output into the high speed low torque input, and this function is very important to high efficiency. The amount of resiliency or elasticity of the resilient coupling is determined to provide optimum operating conditions with respect to these functions and to the applicable speed and load conditions.

Various forms of resilient couplings may be utilized in the differential gear reducer dependent upon the particular applicable operating conditions and several forms are disclosed herein for purposes of illustration. The features of the instant invention may be utilized in multiple stage reducers as well as in single stage reducers. Also, in accordance with this invention, the output members are preferably journalled for rotation in the member having the internal toothed annulus so as to facilitate manufacture and assembly and to reduce tolerances and errors for greater efficiency in operation. Further objects of this invention reside in the details of construction of the differential gear reducer and in the cooperative relationships between the component parts thereof.

Other objects and advantages of this invention will become apparent to those skilled in the art upon reference to the accompanying specification, claims and drawings in which:

FIG. 1 is a vertical sectional view through one form of the differential gear reducer of this invention, taken substantially along the line 1—1 of FIG. 2;

FIG. 2 is a vertical sectional view, taken substantially along the line 2—2 of FIG. 1;

FIG. 3 is a partial vertical sectional view showing another form of the differential gear reducer of this invention, taken substantially along the line 3—3 of FIG. 4;

FIG. 4 is a vertical sectional view, taken substantially along the line 4—4 of FIG. 3;

FIG. 5 is a partial sectional view showing the manner of anchoring the garter spring to one of the ears as illustrated in FIGS. 3 and 4;

FIG. 6 is a vertical sectional view of a further form of the differential gear reducer of this invention, taken substantially along the line 6—6 of FIG. 7, this form of the invention being a two-stage differential gear reducer;

FIG. 7 is a vertical sectional view, taken substantially along the line 7—7 of FIG. 6;

FIG. 8 is a vertical sectional view through still another form of the differential gear reducer of this invention, taken substantially along the line 8—8 of FIG. 9; and FIG. 9 is a vertical sectional view, taken substantially along the line 9—9 of FIG. 8.

Referring first to FIGS. 1 and 2, one form of the differential gear reducer of this invention is generally designated at 10. It includes a shaft 11 such as a shaft of an electric motor which is rotated about the central shaft axis A. Secured to the end of the shaft 11 is an eccentric 12 which may be formed of any suitable material such as powdered iron or the like impregnated with a suitable lubricant. Rotatably mounted on the eccentric 12 is a rotor 13 having external teeth 14, the rotor 13 being formed of any suitable material such as nylon or the like. The external teeth 14 of the rotor mesh with internal teeth 15 of an internal toothed annulus formed on a member 16. The member 16 is suitably stationarily mounted concentrically about the shaft axis A as by securing the same to the electric motor which drives the shaft 11. The numbers of teeth 14 and 15 on the rotor 13 and the member 16 may be selected as desired to provide the desired speed reduction ratio and, for purposes of illustration herein, the internal toothed annulus of the member 16 has 45 teeth and the external teeth on the rotor are 44 in number. As the shaft 11 is rotated, the rotor 13 is oscillated by the eccentric 12 and, due to the relative numbers of teeth 14 and 15, the rotor 13 is also rotated at a reduced speed, the speed reduction ratio being 44 to 1 with the numbers of teeth here described.

The stationary member 16 may be formed of any suitable material such as powdered iron or the like impregnated with a suitable lubricant, and it is provided with an internal bearing surface 17 which is concentric with the shaft axis A. Rotatably mounted in the internal bearing surface 17 is an output member 18 having a shaft extension 19 which also is concentric with the shaft axis A. The output member 18 may be made of any suitable material such as steel or the like and it is held in place in the stationary member 16 by a cap 20 fitting over and suitably secured to the stationary member 16. In order to rotate the ouput member 18 as the rotor 13 is rotated in its oscillating movement, a resilient coupling is connected therebetween. In this connection, the rotor 13 is provided with a plurality of bifurcated ears 22, four such ears being shown for purposes of illustration. The rotor 13 is also preferably provided with openings 23 to provide clearance for a plurality of bifurcated ears 24 carried by the output member 18, four such ears being herein illustrated. A resilient or elastic band 25, which may take the form of a rubber like O-ring, is received within the bifurcated ears 22 and 24 for the purpose of resiliently connecting these ears together. As illustrated, the resilient band 25 is preferably pinched within the respective ears so as to resiliently fix the relative positions of the ears. Thus, as the rotor 13 is rotated in its oscillating movement, the rotary motion thereof is transmitted through the resilient band 25 to the output member 18 for rotating the same. The resilient band 25 thus permits the oscillation of the rotor 13 with respect to the output member 18 while it is transmitting rotary motion from the rotor 13 to the output member 18. Any oscillations of the rotor 13 in a circumferential direction, which may be caused by the interaction of the teeth 14 and 15, are absorbed in the resilient band 25 so that substantially uniform rotary motion is transmitted to the output member 18 and noise is materially reduced. The resilient band 25 also effectively prevents load or tolerance stresses from being reflected back from the slow speed high torque output member 18 into the high speed low torque input shaft 11. This differential gear reducer 10 is particularly adaptable for low power drives such as in clocks, timing mechanisms or the like.

The differential gear reducer 30 illustrated in FIGS. 3–5 is very much like the differential gear reducer 10 illustrated in FIGS. 1 and 2 and like reference characters have been utilized for like parts. The essential difference between the differential gear reducers 10 and 30 resides in the particular construction of the resilient coupling between the rotor 13 and the output member 18. In this respect, the rotor 13 is provided with a plurality of bifurcated ears 32 and the output member 18 is provided with a plurality of bifurcated ears 33. A garter spring 34 is secured in place in the bifurcated ears 32 and 33 by having straight portions of the garter spring being received within the bifurcated ears. Thus, the position of the garter spring 34 with respect to the ears 32 and 33 is positively fixed. The ends of the garter spring 34, as illustrated in FIG. 5, are preferably provided with loops 35 which are received over one of the ears 33 for anchoring the garter spring in place. The differential gear reducer 30 operates in the same manner as the differential gear reducer 10, it, however, providing a somewhat more positive driving action and being suitable for operating heavier loads.

FIGS. 6 and 7 illustrate a two-stage differential gear reducer which is generally designated at 40. It includes a shaft 41 rotated about a central shaft axis A by an electric motor or the like. An eccentric 42 formed of powdered iron or the like and impregnated with a suitable lubricant is secured to the end of the shaft 41. Rotatably mounted on the eccentric 42 is a rotor 43 having external teeth 44, the rotor 43 preferably being molded from nylon or the like. The teeth 43 of the rotor mesh with teeth 45 of an internal toothed annulus formed in a stationary member 46 which is preferably formed of brass or the like. The member 46 is preferably secured to the motor which rotates the shaft 41 concentrically with the shaft axis A.

The member 46 is provided with an internal bearing surface 47 concentric with the shaft axis A and an intermediate member 48 is rotatably journalled therein. The center of the intermediate member 48 is provided with a recess 49 for receiving a ball 50 which engages the end of the motor shaft 41 so as to act as a thrust member. The intermediate member 48 which rotates about the shaft axis A is provided with an eccentric 52. The intermediate member 48 with its eccentric 52 may be formed of any suitable material such as powdered iron or the like impregnated with a suitable lubricant.

A rotor 53 is rotatably mounted on the eccentric 52 and it is provided with external teeth 54 which mesh with internal teeth 55 of an internal toothed annulus also formed in the member 46. The rotor 53 is preferably made from nylon or the like. The member 46 is provided with another internal bearing surface 57 concentric with the shaft axis A, and an output member 58 having a shaft extension 59 is rotatably mounted therein, the output member being formed from steel or the like. The various parts are held within the stationary member 46 by a cap 60 suitably secured to the stationary member 46.

The output member 58 has a plurality of pins 62 extending from the inner face thereof into recesses 63 formed in the rotor 53. Arranged within the recesses 63 of the rotor 53 are integral arms 64 which are provided at their free ends with enlargements 65 which receive the pins 62. These integral arms 64 which are formed from the nylon or the like from which the rotor is formed, thus resiliently connect the rotor 53 to the output member 58. Here the resilient arms 64 are arranged substantially circumferentially so as to permit oscillating movement of the rotor 53 with respect to the output member 58. However, these same resilient arms 64 also operate to transmit rotary motion of the rotor 53 to the output member 58 and since the resilient arms are substantially circumferentially arranged, considerable rotary torque can be transmitted.

The resilient coupling between the rotor 43 and the intermediate member 48 is the same as the resilient connection between the rotor 53 and the output member 58 and like reference characters primed have been utilized for like parts. For purposes of illustration herein, the rotor 43 has 44 external teeth and the internal toothed annulus 45 of the stationary member 46 has 45 teeth so as to provide a first stage speed reduction ratio of 44 to 1. The rotor 53 has 50 external teeth and the internal toothed annulus 58 of the stationary member 46 has 51 internal teeth so as to provide a second stage speed reduction ratio of 50 to 1. Thus, the over-all speed reduction ratio of the two-stage differential gear reducer 40 is 2200 to 1.

The two-stage differential gear reducer 40 is, therefore, particularly adaptable for providing large speed reduction ratios and, since the internal toothed annuli 45 and 55 and the internal bearing surfaces 47 and 57 are all formed in the same stationary member 46, great accuracy can be obtained in the manufacture of this reducer. The same advantageous features which have been discussed above in connection with the differential gear reducer 10 apply equally as well here. In addition, because of the use of the molded resilient arms 64 and 65, large torque loads can also be handled.

The differential gear reducer generally designated at 70 in FIG. 8 is particularly adaptable for uses where extremely high efficiencies are desired, this arrangement providing efficiencies of over 90%. Here the differential gear reducer includes a shaft 71 rotated about a central shaft axis A by an electric motor or the like to the end of which is secured an eccentric 72. A rotor 73 is rotatably mounted on the eccentric 72 by antifriction bearing means including an outer race 74 secured in the rotor 73, a plurality of balls 75 and the eccentric 72 forming the inner race. The antifriction bearing means may be formed of the usual materials, and the rotor 73 is preferably formed of sintered nylon or the like having a suitable filler. The rotor 73 is provided with external teeth 76 which mesh with teeth 77 of an internal toothed annulus formed in a stationary member 78 which is suitably secured to the motor operating the shaft 71 concentrically with the shaft axis A thereof. The stationary member 78 is preferably formed from powdered iron or the like.

The stationary member 78 is provided with a sleeve extension 79 in which is arranged an antifriction bearing having an outer race 80, a plurality of balls 81 and an inner race 82. The antifriction bearing may be formed from conventional materials. The outer race 80 is secured in the sleeve extension 79, and the inner race 82 is secured to a shaft extension 83 of an output member 84 which is preferably formed from nylon or the like. The output member 84 is provided with a central recess 85 having a ball 86 engaging the end of the shaft 71 to act as a thrust member.

A resilient coupling is provided between the rotor 73 and the output member 84 for the purpose of transmitting rotary motion from the former to the latter as the former is oscillated and rotated. In this connection, the rotor 72 has a plurality of pins 88 formed thereon, 8 pins being shown for purposes of illustration. The rotor 84 has a plurality of spirally arranged integral resilient arms 89 extending therefrom which are provided with enlargements 90 at their free ends for receiving the pins 88. The integral arms 89 being formed of nylon or the like provide a resilient or elastic coupling between the pins 88 of the rotor 73 and the output member 84. Because of the spiral arrangement of the resilient arms 89, optimum compliance is obtained and all of the beneficial results described above in connection with the various differential gear reducers are here obtained.

For purposes of illustration here, it is assumed that the rotor 73 has 44 external teeth and that the internal toothed annulus 77 of the stationary member 78 has 45 internal teeth. Thus, there is here also provided a speed reduction ratio of 44 to 1. The various antifriction bearings and the arrangement of the parts are such as to provide for extremely efficient operation.

While, for purposes of illustration, several forms of this invention have been disclosed, other forms thereof may become apparent to those skilled in the art upon reference to this disclosure and, therefore, this inventoin should be limited only by the scope of the appended claims.

I claim as my invention:

1. A differential gear reducer comprising, a rotatable shaft, a stationary internal toothed annulus concentric with the axis of the shaft, an eccentric carried by the shaft, an external toothed rotor member meshing with the internal toothed annulus and rotatably mounted on the eccentric for oscillation with respect to the annulus and for rotation at a reduced speed in accordance with the relative numbers of teeth on the annulus and rotor member, an output member rotatably mounted concentrically with the axis of the shaft, and a resilient coupling between the rotor member and the output member for rotating the output member as the rotor member is rotated and comprising a plurality of pins carried by one of the members and a plurality of radially resilient arms fixedly carried by the other member and rotatably receiving the pins.

2. A differential gear reducer comprising, a rotatable shaft, a stationary internal toothed annulus concentric with the axis of the shaft, an eccentric carried by the shaft, an external toothed rotor member meshing with the internal toothed annulus and rotatably mounted on the eccentric for oscillation with respect to the annulus and for rotation at a reduced speed in accordance with the relative numbers of teeth on the annulus and rotor member, an output member rotatably mounted concentrically with the axis of the shaft, and a resilient coupling between the rotor member and the output member for rotating the output member as the rotor member is rotated and comprising a plurality of pins carried by one of the members and a plurality of substantially spirally arranged resilient arms fixedly carried by the other member and rotatably receiving the pins.

3. A differential gear reducer comprising, a rotatable shaft, a stationary internal toothed annulus concentric with the axis of the shaft, an eccentric carried by the shaft, an external toothed rotor member meshing with the internal toothed annulus and rotatably mounted on the eccentric for oscillation with respect to the annulus and for rotation at a reduced speed in accordance with the relative numbers of teeth on the annulus and rotor member, an output member rotatably mounted concentrically with the axis of the shaft, and a resilient coupling between the rotor member and the output member for rotating the output member as the rotor member is rotated and comprising a plurality of pins carried by one of the members and a plurality of substantially circumferentially arranged resilient arms fixedly carried by the other member and rotatably receiving the pins.

4. A differential gear reducer comprising, a rotatable shaft, a single piece stationary member having an internal toothed annulus concentric with the shaft and an internal bearing concentric with the shaft, an eccentric carried by the shaft, an external toothed rotor meshing with the internal toothed annulus and rotatably mounted on the eccentric for oscillation with respect to the annulus and for rotation at a reduced speed in accordance with the relative numbers of teeth on the annulus and rotor, an output member having a circular periphery which is rotatably mounted in the internal bearing of the stationary member concentrically with the shaft, a cap secured to the stationary member and retaining the output member in place in the stationary member, and a resilient coupling between the rotor and the output member for rotating the output member as the rotor is rotated.

5. A two stage differential gear reducer comprising, a rotatable shaft, a single piece stationary member having a first internal toothed annulus, a first internal bearing, a second internal toothed annulus and a second internal bearing all concentric with the axis of the shaft, a first eccentric carried by the shaft, a first external toothed rotor meshing with the first internal toothed annulus and rotatably mounted on the first eccentric for oscillation with respect to the annulus and for rotation at a reduced speed in accordance with the relative numbers of teeth on the first annulus and the first rotor, an intermediate member having a circular periphery which is rotatably mounted in the first internal bearing concentrically with the axis of the shaft, a resilient coupling between the first rotor and the intermediate member for rotating the intermediate member as the first rotor is rotated, a second eccentric carried by the intermediate member, a second external toothed rotor meshing with the second internal toothed annulus and rotatably mounted on the second eccentric for oscillation with respect to the annulus and for rotation at a reduced speed in accordance with the relative numbers of teeth on the second annulus and the second rotor, an output member having a circular periphery which is rotatably mounted in the second internal bearing concentrically with the axis of the shaft, and a resilient coupling between the second rotor and the output member for rotating the output member as the second rotor is rotated.

6. A two stage differential gear reducer comprising, a rotatable shaft, a single piece stationary member having a first internal toothed annulus, a first internal bearing, a second internal toothed annulus and a second internal bearing all concentric with the axis of the shaft, a first eccentric carried by the shaft, a first external toothed rotor meshing with the first internal toothed annulus and rotatably mounted on the first eccentric for oscillation with respect to the annulus and for rotation at a reduced speed in accordance with the relative numbers of teeth on the first annulus and the first rotor, an intermediate member having a circular periphery which is rotatably mounted in the first internal bearing concentrically with the axis of the shaft, a resilient coupling between the first rotor and the intermediate member for rotating the intermediate member as the first rotor is rotated, a second eccentric carried by the intermediate member, a second external toothed rotor meshing with the second internal toothed annulus and rotatably mounted on the second eccentric for oscillation with respect to the annulus and for rotation at a reduced speed in accordance with the relative numbers of teeth on the second annulus and the second rotor, an output member having a circular periphery which is rotatably mounted in the second internal bearing concentrically with the axis of the shaft, a cap secured to the stationary member and retaining the intermediate member and the output member in place in the stationary member, and a resilient coupling between the second rotor and the output member for rotating the output member as the second rotor is rotated.

References Cited in the file of this patent

UNITED STATES PATENTS

| | | |
|---|---|---|
| 1,831,577 | Richer | Nov. 10, 1931 |
| 1,942,795 | Benson | Jan. 9, 1934 |
| 2,293,407 | Schirrmeister | Aug. 18, 1942 |
| 2,303,365 | Karlsen | Dec. 1, 1942 |
| 2,566,575 | Mann | Sept. 4, 1951 |
| 2,666,345 | Amberg | Jan. 19, 1954 |

FOREIGN PATENTS

| | | |
|---|---|---|
| 79,704 | Switzerland | Jan. 2, 1919 |
| 366,938 | Germany | Jan. 13, 1923 |